(12) United States Patent
Scott et al.

(10) Patent No.: US 7,182,191 B2
(45) Date of Patent: Feb. 27, 2007

(54) MOTION DAMPER

(75) Inventors: John Scott, Highlands Ranch, CO (US); John Macari, Lancing (GB); Brent Parks, Englewood, CO (US)

(73) Assignee: Autoliv ASP, Inc., Ogden, UT (US)

( * ) Notice: Subject to any disclaimer, the term of this patent is extended or adjusted under 35 U.S.C. 154(b) by 362 days.

(21) Appl. No.: 10/701,734

(22) Filed: Nov. 5, 2003

(65) Prior Publication Data

US 2004/0089988 A1    May 13, 2004

Related U.S. Application Data

(63) Continuation-in-part of application No. 10/193,414, filed on Jul. 11, 2002, now Pat. No. 6,907,817.

(51) Int. Cl.
*F16F 7/12* (2006.01)

(52) U.S. Cl. ............... 188/372; 267/64.26; 267/64.28; 267/122

(58) Field of Classification Search ........... 188/371, 188/372, 377; 267/122, 64.11, 64.28, 64.25, 267/64.23, 64.24

See application file for complete search history.

(56) References Cited

U.S. PATENT DOCUMENTS

| | | | |
|---|---|---|---|
| 731,354 A | | 6/1903 | Hochhalter et al. |
| 1,986,273 A | | 1/1935 | Fulton |
| 3,039,347 A | | 6/1962 | Krauss et al. |
| 3,106,131 A | | 10/1963 | Barr et al. |
| 3,199,288 A | | 8/1965 | Nahas |
| 3,565,398 A | | 2/1971 | Floria et al. |
| 3,715,130 A | | 2/1973 | Harada et al. |
| 3,853,199 A | | 12/1974 | Hirashima et al. |
| 3,887,223 A | * | 6/1975 | Bez ............................. 293/133 |
| 3,967,707 A | | 7/1976 | Carlton |
| 3,992,047 A | | 11/1976 | Barényi et al. |
| 3,998,485 A | * | 12/1976 | Putter et al. ............... 293/133 |
| 4,023,652 A | * | 5/1977 | Torke ......................... 188/377 |
| 4,026,590 A | | 5/1977 | Holm |

(Continued)

FOREIGN PATENT DOCUMENTS

DE    33 13713    10/1984

(Continued)

OTHER PUBLICATIONS

"Displacement Controlled Linear Actuator with Differential Cylinder—A Way to Save Primary Energy in Mobile Machines," Robert Rahmfeld et al., Technical University of Hamburg, pp. 1-6.

*Primary Examiner*—Devon Kramer
(74) *Attorney, Agent, or Firm*—Sally J Brown; Madson & Austin

(57) ABSTRACT

The motion damper includes a damper wall, damper stages, and a damper head. The damper wall and damper stages are successively smaller in size and have a nested relationship. The damper wall and damper stages are each flexibly attached to an adjacent damper stage or the damper wall such that the damper stages may deploy in a telescopic fashion away from the damper wall. The damper head is attached to a smallest damper stage. As a result, the damper stages change in position relative to the damper wall and relative to each other to absorb the kinetic energy of objects attached to the damper head and damper wall.

35 Claims, 7 Drawing Sheets

U.S. PATENT DOCUMENTS

| | | | |
|---|---|---|---|
| 4,037,821 A | 7/1977 | Greene | |
| 4,091,621 A | 5/1978 | Patrichi | |
| 4,237,690 A | 12/1980 | Tsuge et al. | |
| 4,360,228 A | 11/1982 | Rasmussen et al. | |
| 4,514,002 A | 4/1985 | McIntosh | |
| 4,560,145 A | 12/1985 | Widmer | |
| 4,582,351 A | 4/1986 | Edwards | |
| 4,687,189 A | 8/1987 | Stoll et al. | |
| 4,932,697 A | 6/1990 | Hun | |
| 5,052,732 A | 10/1991 | Oplet et al. | |
| 5,293,973 A * | 3/1994 | Thum | 188/377 |
| 5,303,631 A | 4/1994 | Frehaut et al. | |
| 5,370,429 A | 12/1994 | Reuber et al. | |
| 5,431,087 A | 7/1995 | Kambara | |
| 5,520,428 A | 5/1996 | Bell | |
| 5,549,327 A | 8/1996 | Rüsche et al. | |
| 5,582,010 A | 12/1996 | Lell | |
| 5,624,143 A | 4/1997 | Waldschmitt | |
| 5,632,518 A | 5/1997 | Kendall | |
| 5,639,117 A | 6/1997 | Mandzy et al. | |
| 5,695,242 A | 12/1997 | Brantman et al. | |
| 5,713,596 A | 2/1998 | Messina et al. | |
| 5,727,826 A | 3/1998 | Frank et al. | |
| 5,749,425 A * | 5/1998 | Cudden | 180/69.2 |
| 5,810,427 A | 9/1998 | Hartmann et al. | |
| 5,967,573 A | 10/1999 | Wang | |
| 6,039,347 A | 3/2000 | Maynard | |
| 6,057,797 A | 5/2000 | Wagner | |
| 6,079,745 A | 6/2000 | Wier | |
| 6,089,628 A | 7/2000 | Schuster | |
| 6,102,439 A | 8/2000 | Smithson et al. | |
| 6,183,025 B1 | 2/2001 | Hope et al. | |
| 6,183,042 B1 | 2/2001 | Unrath | |
| 6,189,941 B1 * | 2/2001 | Nohr | 293/118 |
| 6,264,258 B1 | 7/2001 | Li et al. | |
| 6,340,142 B1 | 1/2002 | Li | |
| 6,371,540 B1 | 4/2002 | Campanella et al. | |
| 6,474,489 B2 | 11/2002 | Payne et al. | |
| 6,702,345 B1 * | 3/2004 | Yoshida | 293/133 |
| 6,802,548 B2 * | 10/2004 | Shimotsu | 293/133 |
| 6,837,518 B2 * | 1/2005 | Mullan | 280/752 |
| 6,854,574 B2 * | 2/2005 | Yoshida et al. | 188/371 |
| 2002/0033755 A1 | 3/2002 | Ishizaki et al. | |
| 2002/0047295 A1 * | 4/2002 | Sullivan et al. | 297/216.1 |
| 2002/0070524 A1 | 6/2002 | Hedenberg | |
| 2002/0109427 A1 | 8/2002 | Hochhalter et al. | |
| 2002/0167183 A1 | 11/2002 | Shimotsu et al. | |
| 2003/0184070 A1 | 10/2003 | Vidal et al. | |

FOREIGN PATENT DOCUMENTS

| | | |
|---|---|---|
| DE | 4 131 734 | 4/1993 |
| DE | 197 24 628 | 1/1998 |
| DE | 199 45 844 | 3/2001 |
| EP | 0 557 733 A1 | 9/1993 |
| EP | 0 535 175 | 12/1994 |
| EP | 0 648 941 | 4/1995 |
| EP | 0 777 064 A1 | 6/1997 |
| EP | 0 794 350 A1 | 9/1997 |
| EP | 0 927 669 | 7/1999 |
| EP | 0 940 584 | 9/1999 |
| GB | 2 076 894 | 12/1981 |
| JP | 48 093045 A | 12/1973 |
| JP | 2001138841 * | 5/2001 |
| WO | WO-95/07415 | 3/1995 |
| WO | WO-98/33683 | 8/1998 |
| WO | WO-01/23225 | 4/2001 |
| WO | WO-02/055337 | 7/2002 |

* cited by examiner

MOTION DAMPER

RELATED APPLICATIONS

This application is a continuation-in-part of patent application Ser. No. 10/193,414 filed Jul. 11, 2002 now U.S. Pat. No. 6,907,817 and entitled Linear Actuator, which is incorporated herein by this reference.

BACKGROUND OF THE INVENTION

1. Field of the Invention

The present invention relates to a motion damper. More specifically, the invention relates to a motion damper used in connection with vehicle safety systems.

2. Description of Related Art

Conventional dampers are used to limit the transfer of kinetic energy between two connected objects. In today's world, dampers are used in a wide variety of applications. For example, shock absorbers in vehicular suspension systems use a common type of damper. These suspension systems use a spring, such as a steel coil, to allow each wheel to move up when the wheel encounters a bump, and to rapidly move back down after the wheel passes the bump. However, if only the spring were used in the suspension system, the vehicle would bounce up and down several times after each bump is encountered, making it uncomfortable to ride in the vehicle and also making it difficult to control the vehicle. The danger of this situation is amplified significantly if a surface on which the vehicle is operated is coated with rain or snow. Thus, the suspension system needs a way to dissipate the energy stored in the spring after the wheel encounters an aberration. A damper performs this function and limits the transfer of the kinetic energy, or vibrations, of the wheels of the vehicle to the passenger compartment of the vehicle.

Conventional dampers have been designed in many different ways. One type of damper involves a piston tightly fitted within a chamber. The piston has a head and an arm connected to the head. The piston head slides within the chamber. Seals around the perimeter of the piston head prevent leakage of the fluid between the piston head and the chamber wall. Thus, the piston head divides the chamber into a first and a second sub-chamber. The piston arm protrudes out of an opening in the chamber. Again, seals are required to prevent fluid leakage through the opening. The piston arm is connected to a first object, such as the wheel of a vehicle, while the chamber is connected to a second object, such as the frame of the vehicle.

A volume of fluid, often oil, is disposed within the chamber. A bi-directional limiting port in the piston head permits the controlled transfer of fluid from the first to the second sub-chamber and vice versa. The limiting port may be designed to allow fluid to flow through the piston head at varying rates. A small limiting port provides for relatively slow transfer of fluid between the sub-chambers and inhibits virtually all oscillation, thus providing a firm ride and nimble handling when used in a shock absorber for a vehicle. A large limiting port, on the other hand, permits rapid transfer of fluid between the sub-chambers and, thus, yields a smooth ride when used in a shock absorber.

In an alternative design, two unidirectional limiting ports are positioned in the piston head. One port permits the fluid to move from the first sub-chamber to the second sub-chamber, while the other port permits the fluid to move from the second sub-chamber to the first sub-chamber. Using two unidirectional ports, a disparate damping effect may be provided, depending on the direction the piston head moves within the chamber.

It takes energy to force the fluid through the limiting port or ports. This energy is converted into thermal energy, i.e., the fluid is heated. Thus, the divergent movement of the objects connected to the damper is converted from kinetic energy into thermal energy to rapidly dissipate the movement of the objects.

The foregoing example illustrates a damper that is very simple in design. However, dampers can be, and often are, much more complex. For instance, some dampers provide varying damping levels through the use of multiple chambers, peripheral passages, or electronic control systems.

Unfortunately, conventional dampers suffer from a number of limitations. First, these dampers are relatively complex and, as a result, are expensive, particularly if the damper is intended to be used only a single time.

Second, conventional dampers have a significant risk of failure when stored for extended periods of time without use. Seals between the chambers may deteriorate over many years of nonuse and fail when the damper is needed. In addition, these conventional dampers must be properly lubricated. Otherwise, friction between the piston head and chamber would inhibit or entirely prevent operation of the damper. Years of nonuse may also decrease lubrication and again result in product failure. Furthermore, a product failure in a vehicle safety system can be much more significant than failures in other areas. Thus, reliability of a damper used in a vehicle safety system is of the high importance.

Third, conventional dampers are not compact. In particular, the damping effect is generally proportional to the length or size of the damper. That is to say, longer and larger dampers generally provide a superior damping effect. As a result, dampers that provide a substantial damping effect are often bulky.

Consequently, it would be an advantage in the art to provide a damper that is simple in design and, thus, can be manufactured in a cost-effective manner. It would be an additional advantage to provide a motion damper that can be stored for long periods of time and still perform reliably when needed. It would be additionally advantageous to provide a damper that is compact, yet provides a significant damping effect.

SUMMARY OF THE INVENTION

The apparatus of the present invention has been developed in response to the present state of the art, and in particular, in response to the problems and needs in the art that have not yet been fully resolved by current dampers. Thus, the present invention provides a motion damper that is compact and simple in design, and is thus inexpensive to manufacture.

The motion damper is comprised of a convoluted member. The convoluted member has a damper head, damper stages, and a damper wall. The damper wall is generally cylindrical in shape and, prior to deployment of the stages, surrounds the damper stages. The damper wall has a first and a second end. The first end of the damper wall is flexibly attached to the largest damper stage, which is adjacent to the damper wall. The second end of the damper wall is attached to a lip which extends away from the second end of the wall. The lip may be used to secure the motion damper to another object, such as a part of a vehicle.

Each of the damper stages is also generally cylindrical in shape. The damper stages are of a successively smaller size. The damper stages and damper wall also have a nested relationship. This means that each of the stages is sized to fit within an adjacent damper stage or the damper wall. Because of the nested relationship, the convoluted member is compact and may be used in small spaces.

The damper wall and damper stages are each flexibly attached to an adjacent damper stage or the damper wall such that the damper stages may telescopically extend away from the damper wall along a longitudinal axis of the convoluted member. Accordingly, each of the damper stages may change in position relative to each other and relative to the damper wall. The damper stages may be made from various types of malleable materials, including various types of metals or plastics.

The smallest damper stage is flexibly attached to a damper head. The damper head is a broad, flat surface and can be used, for example, to secure or attach the convoluted member to another object.

Because the convoluted member is made from a malleable material, the convoluted member can be used to dampen motion between a first object connected to the damper head and a second object connected to the lip or damper wall. As one of the connected objects moves, the stages change in position relative to each other and the wall to absorb the kinetic energy and limit transfer of the kinetic energy to the other connected object. Thus, the convoluted member functions as a motion damper.

The motion damper has numerous uses. For example, the motion damper may be used in connection with a linear actuator to dampen the motion of the linear actuator. In fact, one type of linear actuator also uses a convoluted member. For clarity, when the convoluted member is used as part of a linear actuator, the damper wall will be referred to as an actuator wall, the damper stages will be referred to as piston stages, and the damper head will be referred to as a piston head.

The actuator wall, piston stages, and piston wall define, at least in part, an interior chamber. Thus, by placing a fluid generator over an open end of the actuator wall, pressurized fluid may be forcefully injected into the interior chamber. In response to injection of the pressurized fluid, the piston stages deploy, or extend telescopically away from, the actuator wall to generate linear motion along a longitudinal axis of the linear actuator.

The damper head of the motion damper may be secured to the piston head of a linear actuator to form a dampened actuator. In this configuration, the motion damper dampens the motion of the linear actuator.

The dampened actuator operates in the following way in the context of a motor vehicle. The lip of the motion damper is attached to a first part of a vehicle, and the fluid generator of the linear actuator is attached to a second part of the vehicle. The first and second parts of the vehicle may be pivotally attached to each other. When the fluid generator is activated, the piston stages deploy to generate linear motion, moving the first part of the vehicle away from the second part of the vehicle. The motion dampers then deploy to absorb the kinetic energy of the first part of the vehicle. The damper stages change in position relative to each other to provide a more gradual deceleration of the first part of the vehicle. Were it not for the motion damper, the first part of the vehicle might be damaged by the rapid deceleration resulting from the deployment of the linear actuator.

The dampened actuator can be used in a number of different ways. For instance, the dampened actuator may be used to slightly raise the hood of a vehicle in the event of a vehicle-pedestrian accident such that the hood is used as a "crumple zone" to minimize the danger that the occupant's head or torso will impact the engine block of the vehicle. Also, the dampened actuator could be used to tilt, or recline, a vehicle occupant's seat about a rear pivot point in the event of a roll-over accident so that the occupant's head is positioned further away from the roof in case the roof collapses. The motion damper provides for a more gradual deceleration of a part of a vehicle, such as the hood or seat, attached to the linear actuator in each of these instances.

In view of the foregoing, the motion damper provides substantial advantages over conventional dampers. The motion damper is compact and can be used in the tight confines of a vehicle. The motion damper is also simple in design and, thus, can be manufactured in a cost-effective manner. Furthermore, the motion damper can be stored for long periods of time without significantly increasing the risk of deterioration or malfunction. As a result, the motion damper is ideally suited for many types of vehicle safety systems such as the examples cited above.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings illustrate only selected embodiments of the invention and are not therefore to be considered limiting in scope, the invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1–6, wherein like parts are designated by like numerals throughout. The members of the present invention, as generally described and illustrated in the Figures, may be designed in a wide variety of configurations. Thus, the following more detailed description of the embodiments of the present invention, as represented in the Figures, is not intended to limit the scope of the invention, as claimed, but is merely representative of presently preferred embodiments of the invention.

In this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. Items, parts, or divisions that are "attached" may mechanically interact because of a mechanical fastener, such as a clip, pin, or adhesive, or because the items are integrally formed. The phrases "flexibly attached to" and "pivotally attached to" refer to forms of mechanical coupling that permit relative rotation or relative translation, respectively, while restricting other relative motion.

The phrase "directly attached to" refers to a form of attachment by which the attached items are either in direct contact, or are only separated by a single fastener, adhesive, or other attachment mechanism. The term "abutting" refers to items that are in direct physical contact with each other, although the items may not be attached together.

Figure 1A:
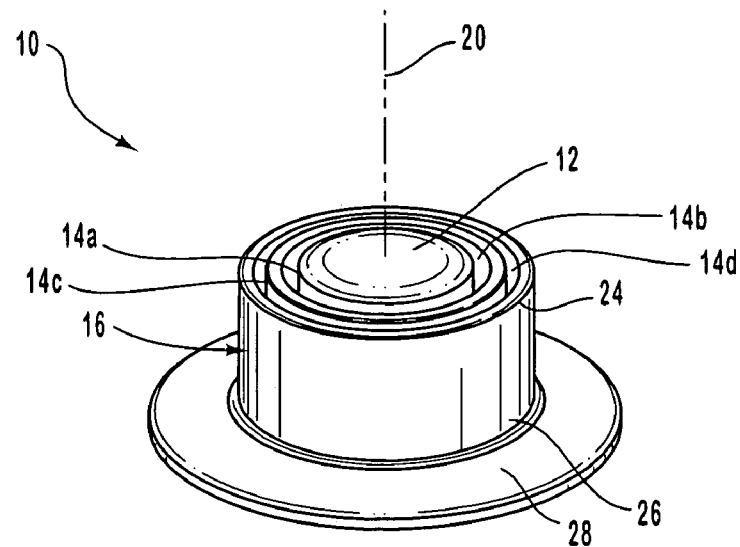
FIG. 1A is a perspective side view illustrating a convoluted member of a motion damper or linear actuator prior to deployment.
Figure 1B:
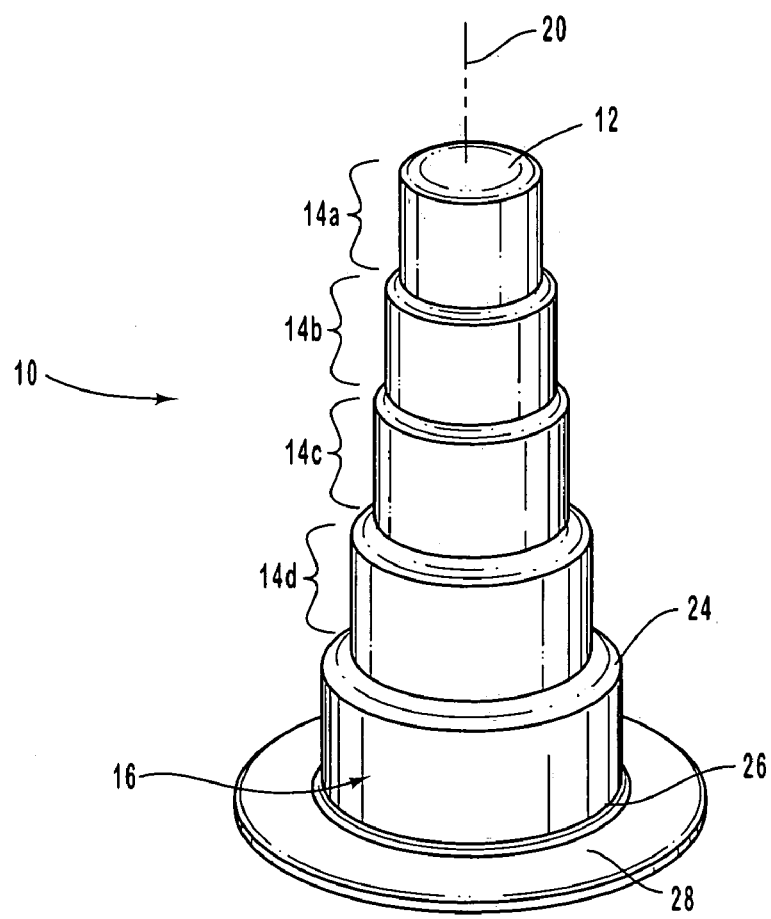
FIG. 1B is a perspective side view illustrating the convoluted member after deployment.

With reference to FIG. 1A, a perspective side view of a convoluted member 10 is shown. The convoluted member 10 may be used in connection with either a motion damper or a linear actuator, both of which are shown in FIGS. 3–6. The convoluted member 10 of FIG. 1A is shown prior to deployment, while FIG. 1B shows the convoluted member 10 following deployment.

Referring to FIG. 1A, the convoluted member 10 includes a head 12, stages 14a–d, and a wall 16. The head 12 is a broad, flat surface and can be used, for example, to secure or attach the convoluted member 10 to another object. When the convoluted member 10 is used as part of a linear actuator, the head 12 is referred to as a "piston head." However, when the convoluted member 10 is used as a motion damper, the term "damper head" will be used to refer to the head 12.

Prior to deployment of the convoluted member 10, the stages 14 of the convoluted member 10 include a series of concentric folds in alternating directions formed in a malleable material. The stages 14 are of a successively smaller size. When the convoluted member 10 is used as part of a linear actuator, the stages 14 will be referred to as "piston stages." The term "damper stages" will be used to refer to the stages 14 when the convoluted member 10 is used as a motion damper.

A smallest stage 14a is attached to the head 12. Again, as stated above, the term "attached to" refers to mechanical interaction between two items because of a fastener or because the items are integrally formed. As illustrated, the head 12 is integrally formed with the stages 14. Alternatively, a mechanical fastener or fasteners, such as an adhesive, bolt, or rivet, may be used to attach the stages 14 to the head 12.

As stated above, the convoluted member 10 also includes a wall 16. The illustrated wall 16 is flexibly attached to the largest stage 14d. The wall 16 extends around a longitudinal axis 20 of the convoluted member 10. Prior to deployment of the stages 14, the stages 14 are generally disposed within, or circumscribed by, the wall 16. The wall 16 includes a first end 24 and second end 26. The first end 24 of the wall 16 is flexibly attached to the largest stage 14d. When the convoluted member 10 is used as a motion damper, the term "damper wall" will be used to refer to the wall 16. In contrast, when the convoluted member 10 is used in connection with a linear actuator, the term "actuator wall" will be used to refer to the wall 16.

A lip 28 extends away from the second end 26 of the wall 16. The lip 28 can be used to secure the convoluted member 10 to another object, such as a part of a vehicle (shown in FIGS. 5 and 6). The illustrated lip 28 extends a uniform distance away from the wall 16. In an alternative embodiment, the lip 28 may include one or more discrete portions that extend away from the wall 16.

Referring now to FIG. 1B, a perspective side view of the convoluted member 10 is shown after deployment. The stages 14a–d have telescopically extended away from the wall 16 and have unfolded in the process. The stages 14 change in position relative to each other and the wall 16. The stages 14 deploy along the longitudinal axis 20 of the convoluted member 10.

FIG. 1B more clearly shows that the wall 16 and the stages 14 are successively smaller in size. In particular, moving from the wall 16 to the head 12, the wall 16 and stages 14 are successively smaller in size.

However, the wall 16 is not necessarily disposed outside of the stages 14. For example, in an alternative embodiment, which is not illustrated, successively larger stages 14 are disposed around the wall 16. In such an embodiment, the wall 16 and stages 14 are of a successively smaller size when moving from the head 12 toward the wall 16.

As stated above, the convoluted member 10 may be used in connection with a linear actuator or may be used as a motion damper to absorb kinetic energy. When used as a linear actuator, a fluid may forcefully be injected into the convoluted member to deploy the piston stages 14. If the convoluted member 10 is used as a motion damper, the damper stages 14 extend, or even contract, to absorb kinetic energy when the damper wall 16 and damper head 12 are connected to objects that are moving either away from or toward each other. Accordingly, the stages 14 change position relative to each other or telescopically extend away from the wall 16 upon the application of a force. This force may drive the stages 14 further away from each other or may drive the stages 14 closer to each other.

As will be understood by those skilled in the art, the convoluted member 10 can be made from various types of malleable, or energy absorbing, materials, including certain types of metals or plastics. Because the convoluted member is made from a malleable material, the convoluted member 10 is a single-use convoluted member. Thus, during deployment, the convoluted member 10 becomes deformed and should thereafter be discarded or recycled.

The illustrated stages 14 and wall 16 are generally cylindrical in shape. However, the stages 14 and wall 16 may be formed in other shapes, such as a generally octagonal, hexagonal, rectangular, or square shape.

Figure 2:
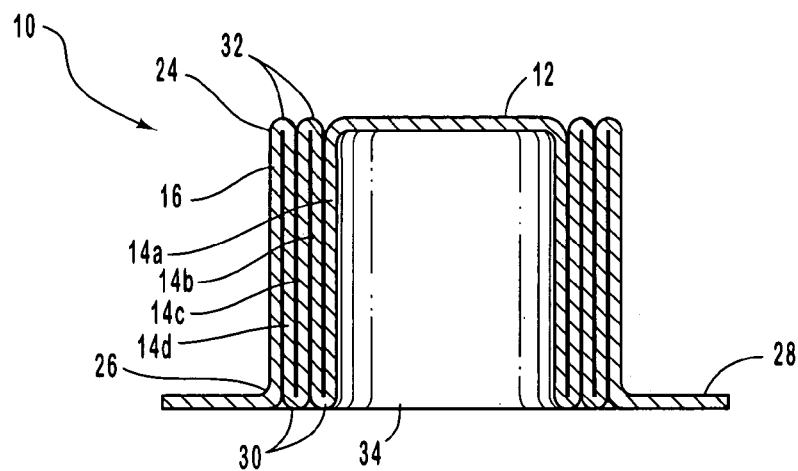
FIG. 2 is a cross-sectional view illustrating a convoluted member prior to deployment.

FIG. 2 illustrates a cross-section view of a convoluted member 10 before deployment. FIG. 2 shows that each stage 14 is flexibly attached to at least one adjacent stage 14. More specifically, each stage 14 is flexibly attached to an adjacent stage 14 by an internal fold 30 or an external fold 32. As stated above, the largest stage 14d is flexibly attached to the first end 24 of the wall 16, while the smallest stage 14a is attached to the head 12. Each stage 14 is flexibly attached to an adjacent stage 14 such that the stages 14 may telescopically extend away from the wall 16.

The wall 16, stages 14, and head 12 may be integrally formed, as shown, or may comprise physically distinct components joined together using, for example, adhesives, rivets, hinges, other types of pivoting members, or a combination of the foregoing. The embodiment of the convoluted member 10 shown in FIGS. 1–3 includes four stages 14. Of course, the number of stages 14 may be varied within the scope of this invention. Also, the stages 14, as illustrated, are each about the same height, but stages 14 of varying sizes also come within the scope of this invention.

As will be understood by those skilled in the art, the flexible attachment between the stages 14 and between the largest stage 14d and the wall 16 may be achieved in a number of different ways. For example, the stages 14 and wall 16 may be connected using a malleable or flexible material. A plurality of hinges or other types of pivoting members may be used. Also, the wall 16 and stages 14 may simply be formed from a malleable or flexible material, as shown in FIG. 2.

The stages 14 and wall 16 have a nested relationship. This means that each of the stages 14 is sized to fit within an adjacent stage 14 or the wall 16. Because of the nested relationship, the convoluted member 10 is compact and may be used in small spaces.

The head 12, stages 14 and wall 16 define, at least in part, an interior chamber 34. When the convoluted member 10 is used as part of a linear actuator, pressurized fluid is injected into the interior chamber 34 to deploy the piston stages 14 of the linear actuator and generate linear motion.

FIG. 2 also shows that the lip 28 is attached to the second end 26 of the wall 16. As illustrated, the wall 16 and lip 28 are integrally formed, but, in an alternative embodiment, the wall 16 and lip 28 may be physically separate components that are attached to each other. In addition, the lip 28 shown in FIG. 2 is generally perpendicular to the wall 16, but may be disposed at other angles in relation to the wall 16 in alternative configurations.

Figure 3:
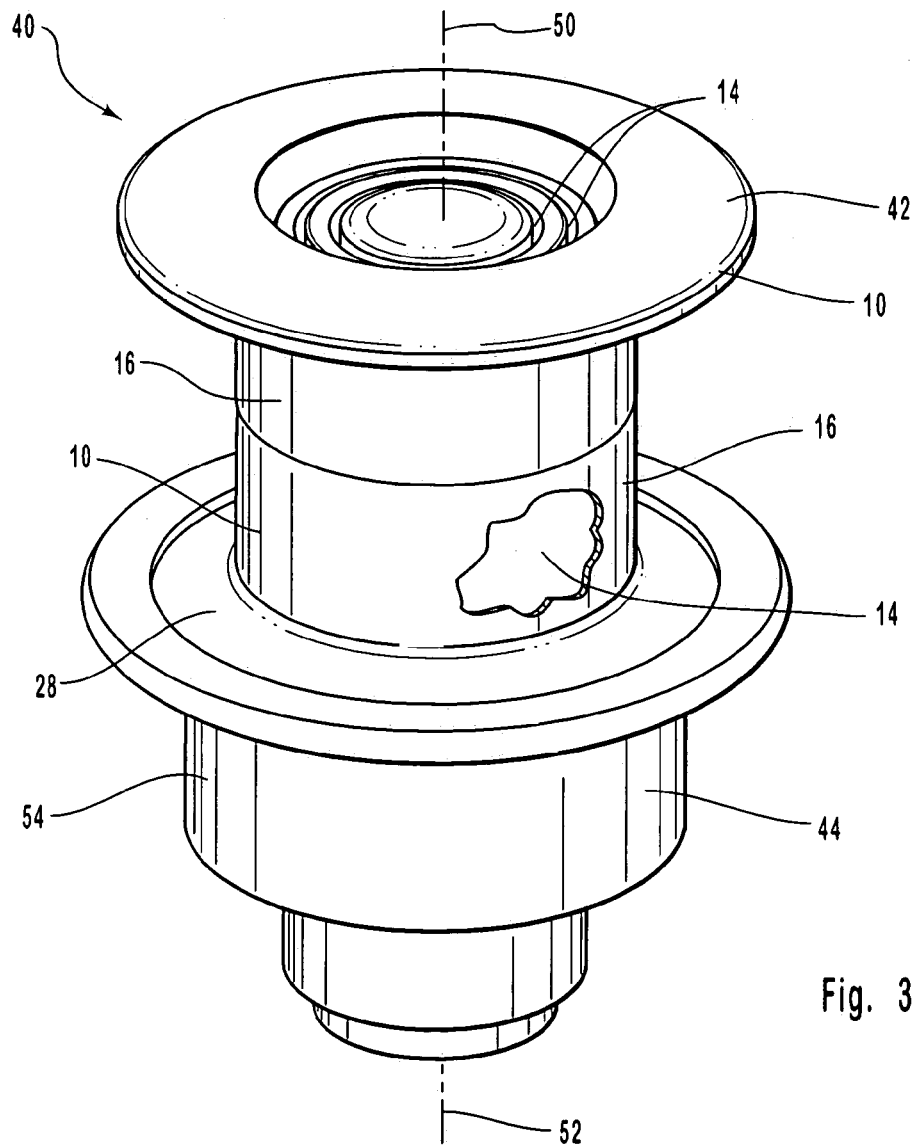
FIG. 3 is a perspective side view of a dampened actuator (prior to deployment), which includes a motion damper and a linear actuator that use the convoluted member.

With reference to FIG. 3, there is shown a perspective side view of a dampened actuator 40 prior to deployment. The dampened actuator 40 includes both a motion damper 42 and linear actuator 44. In FIG. 3, the motion damper 42 is position top of and is attached to the linear actuator 44. The motion damper 42 and linear actuator 44 are coaxial with each other. More specifically, a longitudinal axis 50 of the motion damper 42 is coaxial with a longitudinal axis 52 of the linear actuator 44.

The motion damper 42 is comprised of a convoluted member 10 that is made from an energy absorbing material. Accordingly, the damper stages 14 telescopically extend away from, or are pushed toward, the damper wall 16 to absorb the kinetic energy of an object attached to the motion damper 42.

The linear actuator 44 has a convoluted member 10 attached to and in fluid communication with the fluid generator 54. In FIG. 3, a portion of the actuator wall 16 is cut away to show the piston stages 14. The fluid generator 54 produces a pressurized gas, liquid, or foam to deploy, or telescopically extend, the piston stages 14 of the linear actuator 44. As will be understood by those skilled in the art, the fluid generator 54 can use pyrotechnic methods, or methods for releasing compressed fluids, or a combination of the foregoing to generate the pressurized fluid. As shown, the fluid generator 54 is attached to the lip 28 of the convoluted member 10 of the linear actuator 44.

Figure 4A:
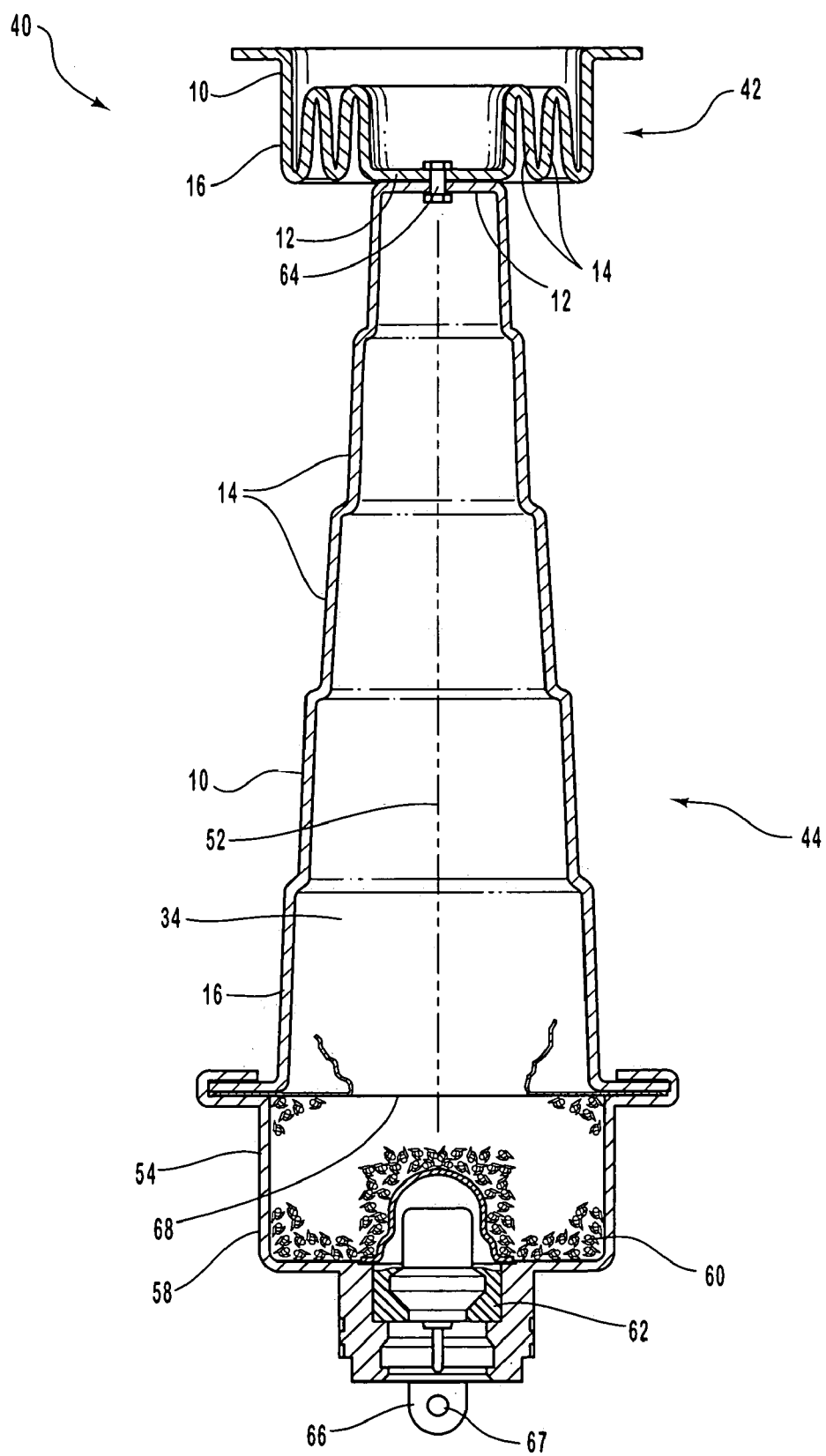
FIG. 4A is a cross-sectional view showing a dampened actuator after deployment of the linear actuator.

Referring to FIG. 4A, a cross-sectional view of a dampened actuator 40 after deployment of the linear actuator 44 is illustrated. As shown, the motion damper 42 has not yet been deployed. The damper stages 14 are still relatively close to each other such that the damper stages 14 are substantially disposed within the damper wall 16.

The actuator wall 16 and actuator stages 14 define, at least in part, an interior chamber 34. The fluid generator 54 is in fluid communication with the interior chamber 34.

As shown, the fluid generator 54 comprises a housing 58 containing gas generant 60 and an initiator 62. In response to receipt of a signal from a sensor (not shown), which determines when accident conditions exist, the initiator 62 activates the gas generant 60 to produce pressurized inflation gas.

The pressurized inflation gas pushes-against the piston stages 14. The amount of pressurized inflation gas produced by the fluid generator 54 depends on the specific use of the linear actuator 44. In the embodiment shown in FIG. 4A, the pressure of the inflation gas is sufficient to fully extend each piston stage 14. To be more precise, the piston stages 14 have fully extended away from the piston wall 16 and increased a distance between each piston stage 14 to generate rapid linear motion along the longitudinal axis 52 of the linear actuator 44.

As illustrated in FIG. 4A, the damper head 12 is attached to the piston head 12 using a rivet 64. The use of the rivet 64 is only illustrative. Other types of mechanical fasteners, such as adhesives or a nut and bolt, may be used attach the damper head 12 to the piston head 12. Alternatively, the convoluted member 10 of the motion damper 42 and the convoluted member 10 of the linear actuator 44 may be integrally formed.

Figure 5:
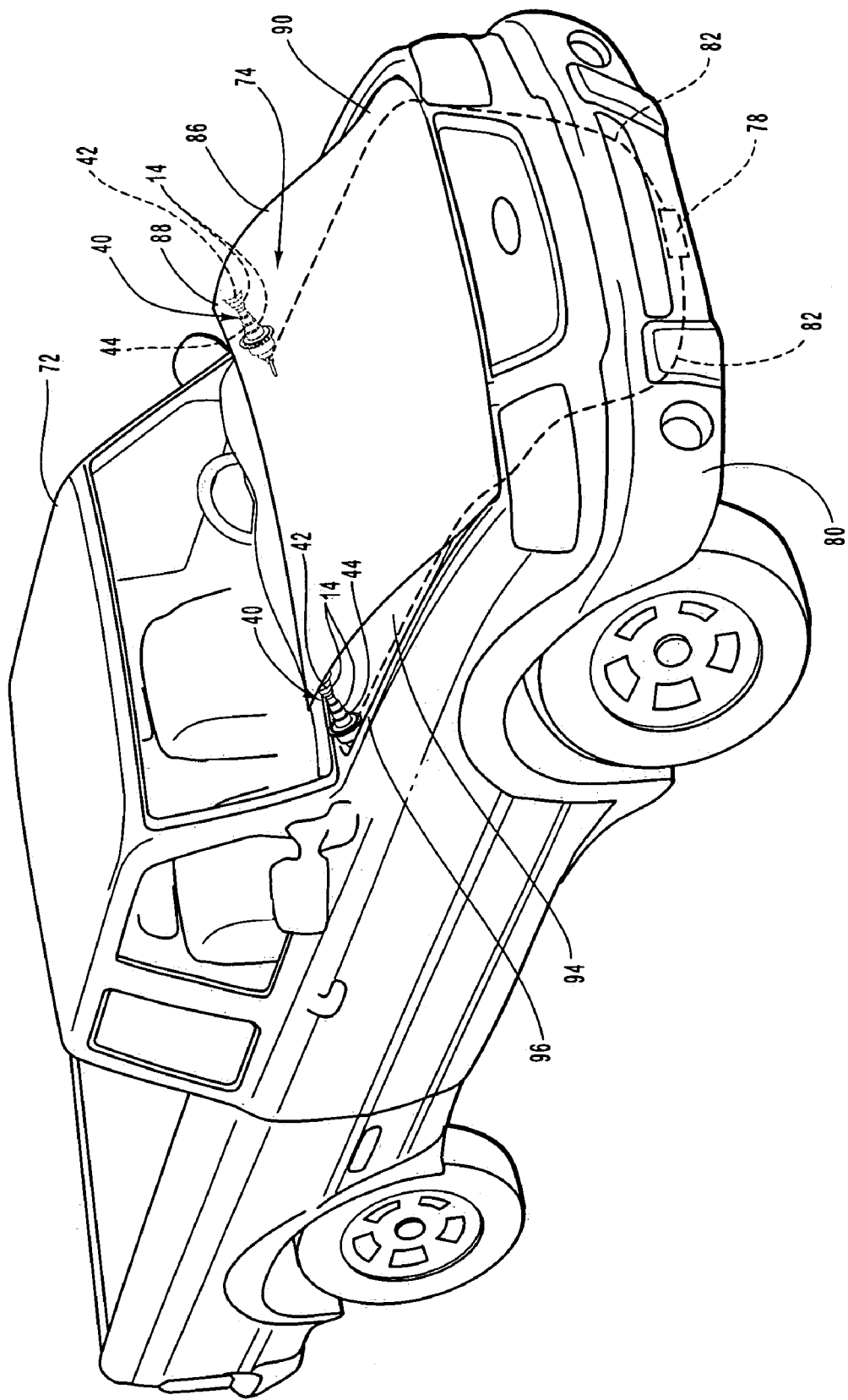
FIG. 5 is a perspective view of a vehicle having a pedestrian safety system that uses the dampened actuator, the pedestrian safety system being shown in deployed condition.
Figure 6A:
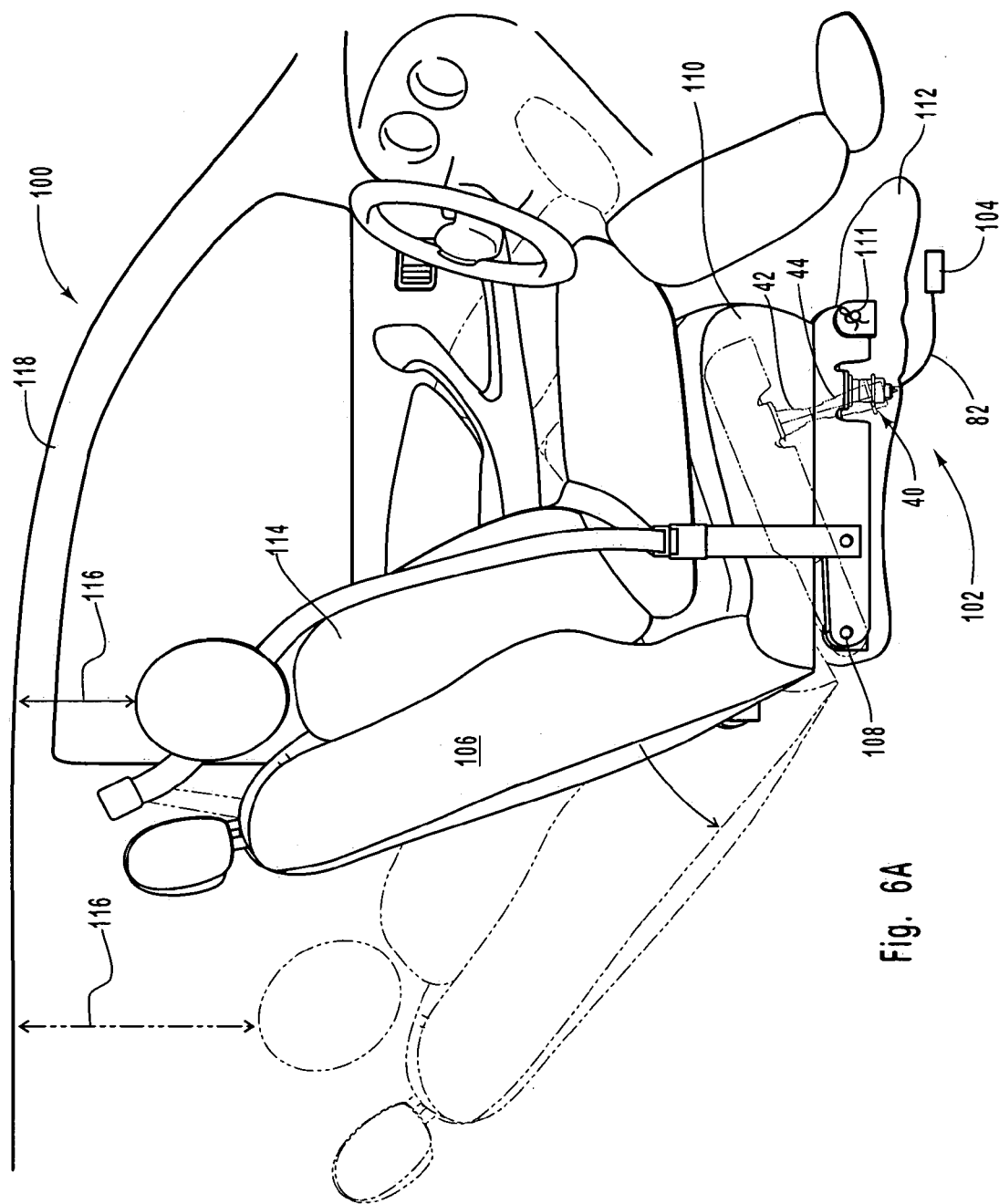
FIG. 6A is a perspective view of a vehicle having a rollover safety system that uses the dampened actuator, the rollover safety system being shown in phantom in a deployed condition.
Figure 6B:
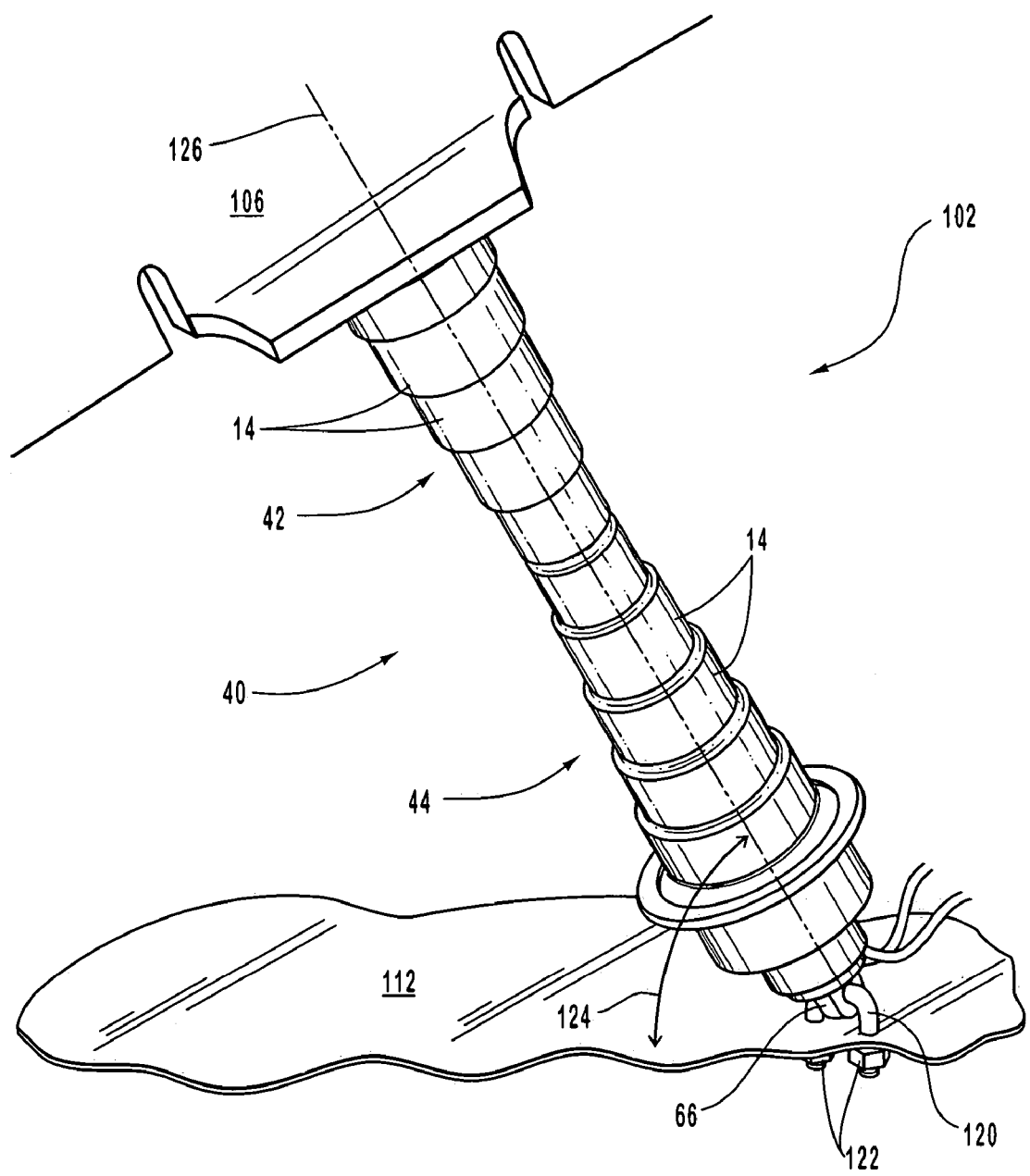
FIG. 6B is an enlarged perspective view of the dampened actuator of the rollover safety system in a deployed condition.

The linear actuator 44 and/or motion damper 42 optionally includes one or more attachment brackets 66 to permit pivotal connection of the dampened actuator 40 to an object, such a part of a vehicle, which is illustrated in FIGS. 5 and 6. A pivotal connection is achieved when, for example, a U-shaped bolt (shown in FIG. 6B) is positioned in an opening 67 in the attachment bracket 66 and then the U-shaped bolt is secured to the object.

In an alternative embodiment, the fluid generator 54 is remote to the interior chamber 34. In such a design, a gas guide (not shown) conveys the pressurized fluid generated by the fluid generator 54 to the interior chamber 34. Of course, in such a design, the open end 68 of the actuator wall 16 is enclosed so that the pressurized fluid deploys the piston stages 14 rather than exiting through the open end 68 of the actuator wall 16.

Figure 4B:
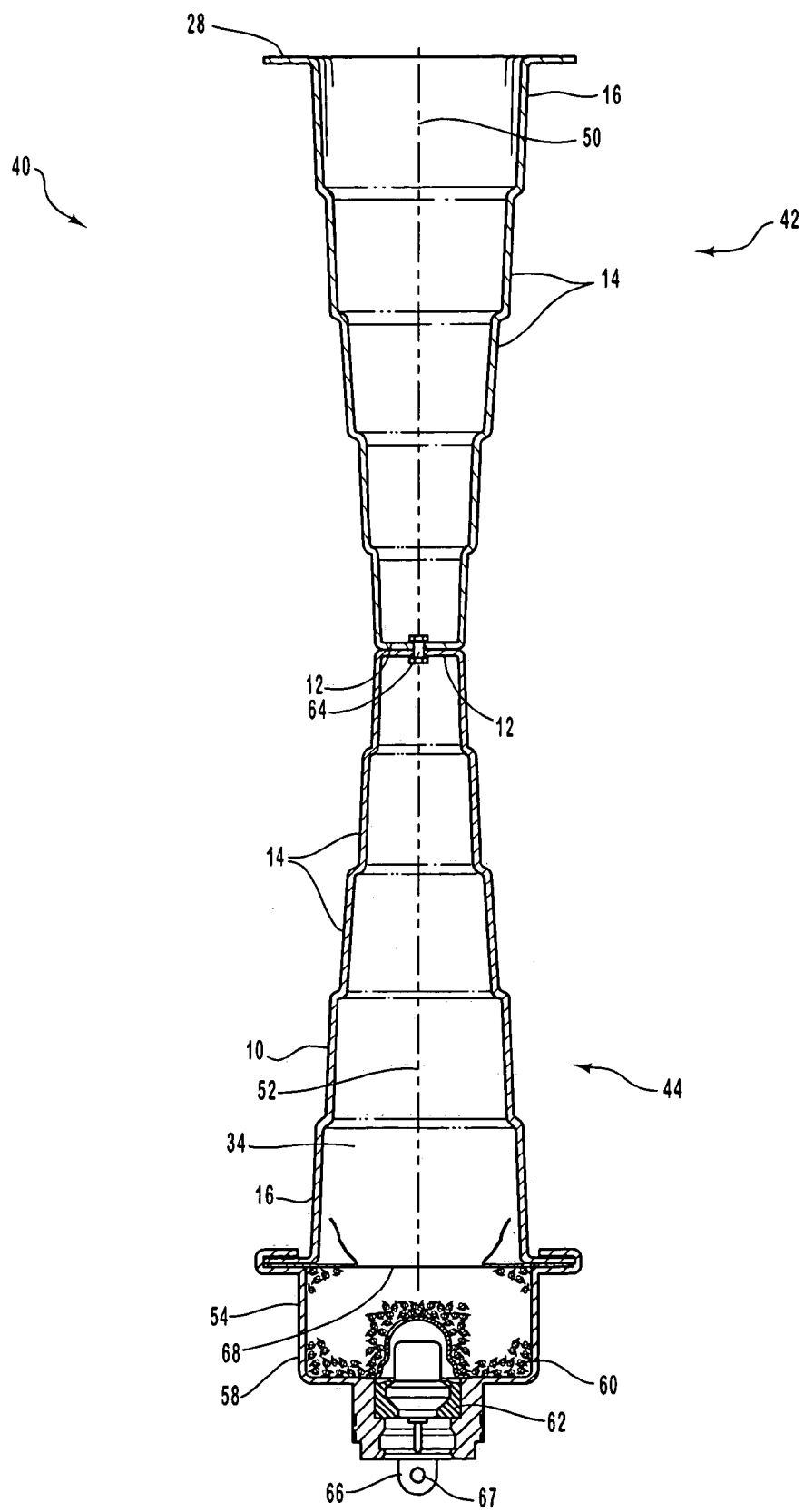
FIG. 4B is a cross-sectional view illustrating a dampened actuator after deployment of the linear actuator and the motion damper.

FIG. 4B is a cross-sectional view illustrating a dampened actuator 40 after deployment of the motion damper 42 and linear actuator 44. Following deployment of the linear actuator 44, strong inertial forces are applied to the motion damper 42. As a result, each damper stage 14 changes in position relative to an adjacent damper stage 14. More specifically, the damper stages 14 move further apart from each other along the longitudinal axis 50 of the motion damper 42 and extend telescopically away from the damper wall 16. As a result of the damping effect, the lip 28 of the motion damper 42 decelerates more slowly than the piston head 12. Thus, the motion damper 42 dampens the motion of the linear actuator 44 and provides a more gradual deceleration of an object that is connected to the lip 28 of the dampened actuator 40.

Referring now to FIG. 5, a perspective view of a vehicle 72 having a pedestrian safety system 74 is shown in a deployed condition. The illustrated pedestrian safety system 74 includes an impact sensor 78 in communication with two dampened actuators 40. The impact sensor 78 determines when the vehicle 72 has impacted an object, such as a pedestrian. The illustrated impact sensor 78 is located in the front bumper 80 of the vehicle 72. Alternatively, the sensor 78 could be embodied as an electronic control unit (ECU) that senses abnormal acceleration or deceleration of the vehicle 72. In any case, when an impact, or a potential vehicle-pedestrian impact is sensed, the impact sensor 78 sends a signal to the two dampened actuators 40. Wiring 82, for example, may be used to transmit an electrical signal from the impact sensor 78 to the dampened actuators 40.

A hood 86, which is pivotally attached to a portion of the vehicle 72, includes a pivoting end 88 and a remote end 90. The motion damper 42 of each dampened actuator 40 is connected to hood 86 near the pivoting end 88, while the linear actuator 44 of each dampened actuator 40 is connected to another part of the vehicle 72 that is located within the engine compartment 94, such as the frame or body 96 of the vehicle 72. Alternatively, the linear actuators 44 could be connected to the hood 86 near the pivoting end 88, while the motion dampers 42 could be connected to the frame or body 96. Within the scope of this invention, the dampened actuators 40 could be positioned at various locations on the hood 86. For example, the dampened actuators 40 could be positioned near the remote end 90 of the hood 86, or at other positions between or on the pivoting and remote ends 88, 90 of the hood 86.

The linear actuator 44 and motion damper 42 may include one or more attachment brackets 66 (shown in FIG. 4A) to permit pivotal attachment of the linear actuator 44 to the body 96 and pivotal attachment of the motion damper 42 to the remote end 90 of the hood 86. Of course, those skilled in the art will recognize that various techniques, including selective connection of the dampened actuator 40 to the hood 86, may be used to permit opening and closing of the hood 86 during normal usage.

When the dampened actuators 40 receive the signal, the linear actuators 44 inflate and deploy the piston stages 14. As a result, the hood 86 is rapidly lifted. The motion dampers 42 then deploy to absorb the kinetic energy of the hood 86, as shown in FIG. 5. The damper stages 14 change in position relative to each other to provide a more gradual deceleration of the hood 86. Were it not for the motion dampers 42, the hood 86 might be damaged by the rapid acceleration and deceleration resulting from deployment of the linear actuators 44. If so, automobile manufacturers would be less likely to use the pedestrian safety system 74 because manufacturers, or the end user, would be required to replace or repair the hood 86 of the vehicle 72, even when the hood 86 was not otherwise damaged by the accident.

Those skilled in the art will recognize that many variations of the illustrated embodiment of the pedestrian safety system 74 come with scope of this invention. For instance, the number and positioning of the dampened actuators 40 may vary depending of the design of the vehicle 72 in which the system 74 is installed.

The purpose of rapidly elevating the hood 86 in the event of a pedestrian impact is to limit injuries to the pedestrian. Frequently, in a vehicle-pedestrian accident, the pedestrian will rotate such that the pedestrian's head, or upper body, impact the hood 86, and then the engine block of the vehicle 72 at a high rate of speed. Rapidly raising the hood 86 using the pedestrian safety system 74 transforms the hood 86 into a "crumple zone," such that hood 86 more gradually decelerates the pedestrian to minimize the severity of the pedestrian's injuries.

With reference to FIG. 6A, there is shown a side perspective view of a vehicle 100 having a rollover safety system 102 that uses the dampened actuator 40. The safety system 102 includes an accident sensor 104, such as an ECU, in communication with one or more dampened actuators 40. When the accident sensor 104 determines that the vehicle 100 has been involved in an accident, the accident sensor 104 transmits a signal through wiring 82 to the dampened actuator 40. Alternatively, the accident sensor 104 may determine when the vehicle 100 becomes inverted or rolls over and send a signal in response thereto.

The illustrated seat 106 is pivotally attached to the vehicle 100 and, thus, includes a pivot point 108 and a distal end 110. In one configuration, the seat 106 may include shear pins 111 which are severed by the sudden forceful movement of the distal end 110 of the seat 106. Shear pins 111 prevent the seat 106 from pivoting until an accident is detected.

As shown, the linear actuator 44 of the dampened actuator 40 is connected to a floor 112 of the vehicle 100 and the motion damper 42 of the dampened actuator 40 is connected to the distal end 110 of the seat 106. Alternatively, the linear actuator 44 could be connected to the distal end 110 of the seat 106, while the motion damper 42 could be connected to floor 112 of the vehicle 100.

Accordingly, when a signal is received from the accident sensor 104, the linear actuator 44 deploys and reclines the seat 106. Thereafter, the motion damper 42 deploys to provide a more gradual deceleration of the seat 106 to minimize discomfort to the occupant 114. As a result, the seat 106 moves into a reclined position, as shown in phantom in FIG. 6A.

The reclined seat 106 provides additional clearance 116 between the roof 118 and the occupant 114. Therefore, in an accident in which the roof 118 may collapse, the reclined position of the seat 106 decreases the risk that the occupant 114 will be impacted by the roof 118 of the vehicle 100.

Referring to FIG. 6B, an enlarged perspective view of the dampened actuator, 40 of the rollover safety system 102 is shown in a deployed condition. As illustrated, the stages 14, 14 of both the motion damper 42 and linear actuator 44 are in a deployed condition. Accordingly, the seat 106 is in a reclined position, as shown in phantom in FIG. 6A.

Again, the motion damper 42 is connected to the seat 106, while the linear actuator 44 is connected to the floor 112 of the vehicle 100. The linear actuator 44 includes an attachment bracket 66 that permits pivotal connection of the dampened actuator 40 to the floor 112 using a U-shaped bolt 120 and two nuts 122. This pivotal connection permits the dampened actuator 40 to rotate relative to the floor 112 as the seat 106 pivots away from the floor 112 without contorting, and possibly damaging, the dampened actuator 40. Thus, an angle 124 between a longitudinal axis 126 of the dampened actuator 40 and the floor 112 may change without damaging or twisting the dampened actuator 40.

In an alternative embodiment, both the linear actuator 44 and motion damper 42 include an attachment bracket 66 to permit pivotal connection of the dampened actuator 40 to both the seat 106 and floor 112. Of course, those skilled in the art will recognize that various types of pivotal connection mechanisms may be used in connection with the dampened actuator 40.

In summary, the motion damper provides substantial advantages over conventional dampers. The motion damper is compact and can be used in the tight confines of a vehicle. The motion damper is also simple in design and, thus, can be manufactured in a cost-effective manner. Furthermore, the motion damper can be stored for long periods of time without significantly increasing the risk of deterioration or malfunction. As a result, the motion damper is ideally suited for many types of vehicle safety systems such as the examples discussed above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A dampened actuator, comprising:
   a first wall having a first end;
   at least two first stages, each first stage being flexibly attached to at least one adjacent first stage, one of the first stages being flexibly attached to the first end of the first wall, wherein the first wall and first stages are of successively smaller size and wherein the first wall and first stages define an interior chamber;
   a fluid generator in fluid communication with the interior chamber, wherein upon deployment of the fluid generator, at least one of the first stages expands such that at least one of the first stages is accelerated;
   a second wall having a first end;
   at least two second stages, each second stage being flexibly attached to at least one adjacent second stage, one of the second stages being flexibly attached to the first end of the second wall, wherein the second wall and second stages are of a successively smaller size, wherein the acceleration of the at least one of the first stages causes the inertial movement of the second wall and subsequently at least one of the second stages deploys to decelerate the inertial movement of the second wall, thereby controlling the direction and velocity of the dampened actuator.

2. The dampened actuator of claim 1, wherein upon the application of a force, at least one second stage changes in position relative to an adjacent second stage.

3. The dampened actuator of claim 1, wherein each second stage is flexibly attached to an adjacent second stage such that the second stages upon the application of a force, telescopically extend away from the second wall.

4. The dampened actuator of claim 1, wherein the second stages are made from an energy absorbing material.

5. The dampened actuator of claim 4, wherein the energy absorbing material is plastic.

6. The dampened actuator of claim 4, wherein the energy absorbing material is metal.

7. The dampened actuator of claim 1, wherein at least one second stage is sized to fit within an adjacent second stage.

8. The dampened actuator of claim 1, wherein the second wall and second stages have a nested relationship prior to deployment.

9. The dampened actuator of claim 1, wherein the second wall and second stages are integrally formed.

10. The dampened actuator of claim 1, wherein the second stages are single-acting second stages.

11. A dampened actuator comprising:
    a first convoluted member having a fluid generator, a first wall, at least two first stages, a first head, and an interior chamber defined at least in part by the first wall and first stages, each first stage being flexibly attached to at least one adjacent first stage, one of the first stages being flexibly attached to the first wall and another first stage being attached to the first head, the first wall and the first stages being of a successively smaller size, and the fluid generator being in fluid communication with the interior chamber, wherein upon deployment of the fluid generator, the first convoluted member expands such that the first head is accelerated; and
    a second convoluted member having a second wall, at least two second stages, and a second head, each second stage being flexibly attached to at least one adjacent second stage, one of the second stages being flexibly attached to the second wall and another second stage being attached to the second head, the second wall and second stages being of a successively smaller size, and the second head being attached to the first head, such that the first convoluted member and the second convoluted member are attached together in series, wherein the acceleration of the first convoluted member causes the inertial movement of the second convoluted member and subsequent expansion of the second convoluted member to decelerate the inertial movement of the second convoluted member, thereby controlling the direction and velocity of the dampened actuator.

12. The dampened actuator of claim 11, wherein upon the application of a force, at least one second stage changes in position relative to an adjacent second stage.

13. The dampened actuator of claim 11, wherein each second stage is flexibly attached to an adjacent second stage such that upon the application of a force, the second stages telescopically extend away from the second wall.

14. The dampened actuator of claim 11, wherein the second stages are made from an energy absorbing material.

15. The dampened actuator of claim 11, wherein the first stages deploy in response to activation of the fluid generator.

16. The dampened actuator of claim 11, wherein at least one second stage is sized to fit within an adjacent second stage.

17. The dampened actuator of claim 11, wherein the second wall and second stages have a nested relationship prior to deployment.

18. The dampened actuator of claim 11, wherein the first convoluted member is a single-acting convoluted member.

19. The dampened actuator of claim 11, wherein the second convoluted member is a single-acting convoluted member.

20. The dampened actuator of claim 11, wherein the second wall, second stages, and second head are integrally formed.

21. The dampened actuator of claim 11, wherein the first wall, first stages, and first head are integrally formed.

22. A dampened actuator for use in a vehicle comprising:
    a first convoluted member having a fluid generator, a first wall, at least two first stages, a first head, and an interior chamber defined at least in part by the first wall and first stages, each first stage being flexibly attached to at least one adjacent first stage, one of the first stages being flexibly attached to the first wall and another first stage being attached to the first head, the first wall and first stages being of a successively smaller size, the fluid generator being in fluid communication with the interior chamber, and the first convoluted member being connected to a first part of a vehicle; and
    a second convoluted member having a second wall, at least two second stages, and a second head, each second stage being flexibly attached to at least one adjacent second stage, one of the second stages being flexibly attached to the second wall and another second stage being attached to the second head, the second wall and second stages being of a successively smaller size, the second head being attached to the first head, such that the first convoluted member and the second convoluted member are attached together in series;

wherein upon deployment of the fluid generator, the first convoluted member expands such that the first head is accelerated; and wherein the acceleration of the first convoluted member causes the inertial movement of the second convoluted member and subsequent expansion of the second convoluted member to decelerate the inertial movement of the second convoluted member, thereby controlling the direction and velocity of the dampened actuator, and the second convoluted member being connected to a second part of the vehicle.

23. The dampened actuator of claim 22, wherein upon the application of a force, at least one second stage changes in position relative to an adjacent second stage.

24. The dampened actuator of claim 22, wherein each second stage is flexibly attached to an adjacent second stage such that upon the application of a force, the second stages telescopically extend away from the second wall.

25. The dampened actuator of claim 22, wherein the first stages deploy in response to activation of the fluid generator.

26. The dampened actuator of claim 22, wherein at least one second stage is sized to fit within an adjacent second stage.

27. The dampened actuator of claim 22, wherein the second wall and second stages have a nested relationship prior to deployment.

28. The dampened actuator of claim 22, wherein the second convoluted member is a single-acting convoluted member.

29. The dampened actuator of claim 22, wherein the first convoluted member is a single-acting convoluted member.

30. The dampened actuator of claim 22, wherein the first convoluted member and second convoluted member are coaxial.

31. The dampened actuator of claim 22, wherein the first part of the vehicle is pivotally attached to the vehicle.

32. The dampened actuator of claim 31, wherein the first part of the vehicle is a seat.

33. The dampened actuator of claim 31, wherein the first part of the vehicle is a hood.

34. The dampened actuator of claim 22, wherein the second wall, second stages, and second head are integrally formed.

35. The dampened actuator of claim 22, wherein the first wall, first stages, and first head are integrally formed.

* * * * *